United States Patent [19]
Fisher et al.

[11] 3,833,871
[45] Sept. 3, 1974

[54] COIL CONNECTIONS FOR AN ELECTROMAGNETIC DRIVE

[75] Inventors: Ferdinand W. Fisher; Clifton D. Sweet, Jr., both of Harrodsburg, Ky.

[73] Assignee: Eaton Corporation, Cleveland, Ohio

[22] Filed: Nov. 19, 1973

[21] Appl. No.: 417,457

[52] U.S. Cl............... 335/282, 192/84 B, 192/84 C
[51] Int. Cl................................................. H01f 5/04
[58] Field of Search .......... 335/282, 299; 192/84 A, 192/84 B, 84 C

[56] References Cited
UNITED STATES PATENTS

| | | | |
|---|---|---|---|
| 3,130,355 | 4/1964 | Younger | 335/299 |
| 3,162,285 | 12/1964 | Sala | 192/84 A |
| 3,214,084 | 10/1965 | Smirl | 192/84 A |
| 3,494,453 | 2/1970 | Sepko | 335/282 X |

Primary Examiner—G. Harris
Attorney, Agent, or Firm—Teagno & Toddy

[57] ABSTRACT

An electromagnetic drive has a uniquely mounted electric coil located within an annular recessed member of the electromagnetic drive to electrically ground the coil to the recessed member along the inner periphery of the coil. A power lead is ultrasonically welded to an insulated outer lead wire of the electric coil so as to have the power lead angularly contact the conductive portion of the lead wire. Energization of the coil by a current passing from the lead wire to the grounded coil produces an electromagnetic field which controls the application of torque between a driving member and a driven member of the electromagnetic drive. The method of mounting the electric coil includes a step wherein the coil is interference pressed onto the annular recessed member in a manner which removes the electrical insulation from the radially inner windings of the coil to electrically ground the coil to the recessed member.

6 Claims, 7 Drawing Figures

COIL CONNECTIONS FOR AN ELECTROMAGNETIC DRIVE

BACKGROUND OF THE INVENTION

1. Field of the Invention

The present invention relates to electromagnetic couplings generally and particularly to electromagnetic couplings having uniquely mounted electric coils which are electrically grounded to their mounting members during the mounting process.

2. Description of the Prior Art

In known clutching mechanism for power transmission and particularly for power transmission in automotive air conditioning compressors, it is common practice to use an electromagnetic clutch coupling. This clutch usually includes an electric coil and acts to electromagnetically couple a driving member to a driven member. As applied to automotive air conditioning compressors, the driving member includes a belt-driven pulley which is coupled by the clutch to the driven member. The driven member is connected to the compressor shaft and drives it in response to a coupling between itself and the driving member.

The electric coil of the clutch is usually either stationarily mounted or is mounted to rotate with the driving pulley member. When the coil is mounted to rotate with the pulley, the pulley is formed to have an annular recess for mounting an electric coil therein to have the pulley rotate with the coil. An example of this type of coil mounting is shown in the Smirl U.S. Pat. No. 3,214,084 issued Oct. 26, 1965. When the coil is stationarily mounted, it is usually mounted within a recessed member directly connected to a stationary face of the compressor between the compressor and the pulley. Regardless of the mounting of the coil, when the coil is not energized, the driven member remains stationary in the non-driving state with the pulley being free to rotate with respect to the compressor shaft. Upon energization of the electric coil, the flow of current through the coil creates lines of magnetic flux which attract the driven member to the driving pulley and cause rotation of the driven member with the rotation of the pulley and consequently the rotation of the compressor shaft.

In automotive air conditioning applications of this type, the source of electrical energy is usually a single wire electrical system of the vehicle which is either directly connected to the battery or is indirectly connected through the output of the vehicle electrical generator. Because of this single wire electrical system, it is necessary to ground one end of the electrical coil of the clutch to a common ground used for the electrical system of the vehicle. Such a common ground is the vehicle chassis to which the major metallic components of the automobile are electrically connected by metal members.

The previously known techniques for accomplishing direct grounding of the coil involved the forming of the coil onto a separate conductive ring in a manner which grounded the coil to the ring. In applications using the rotating clutch coil, the coil wound on the grounding ring is secured within the pulley to form an electrical connection between the coil, the grounding ring, and the pulley thereby grounding the coil to the pulley which is in turn connected to ground. An example of this type of application is shown in the Sepko U.S. Pat. No. 3,494,453 issued Feb. 10, 1970. In applications using the stationary clutch coil, the coil is mounted within a stationary mounting member and a separate electrical lead is connected from ground to the grounding ring of the coil or directly to one end of the coil to thereby ground the coil.

Clearly, the prior art coil mountings require additional parts to effect grounding of the coil such as the separate grounding ring and/or the grounding wire. Additive operations are also required to attach the grounding ring to the coil and/or the ground wire to the coil.

SUMMARY OF THE INVENTION

The present invention solves the previously mentioned problems of the prior art as well as other problems by providing an improved electromagnetic coupling for transmitting power between a driving member and a driven member as, for example, the driving pulley and the compressor shaft of an automotive air conditioning compressor. The coupling of the present invention utilizes an electric coil which is grounded directly to a mounting member for the coil when the coil is pressed into the mounting member. Energization of the coil is accomplished through a single power lead connection which is angularly attached to and welded around a circumference of one end of an insulated conductor wound to make the coil. The grounding of the coil of the present invention is effected to an inner surface of the mounting member in the following manner. The coil is prewound to a predetermined diameter slighty smaller than an axially extending annular mounting surface of the mounting member. The coil is then pressed onto the annular mounting surface. During the pressing of the coil onto the mounting surface, a portion of the insulation on the inner periphery of the inner windings of the coil is removed due to interference between the coil and the annular recess surface to effect direct grounding of the inner windings of the coil to the mounting member.

The present invention thus provides a unique electromagnetic coupling assembled by a simple and effective method to provide an improved electromagnetic coupling of the type used for automotive air conditioning compressors. The assembly method of the present invention permits the coil to be assembled directly onto the mounting member and directly grounded thereto without requiring any assembly of the coil to an intermediate grounding ring or the attachment of a separate ground wire.

These and other benefits of the present invention will become more apparent upon a review of the following description of the preferred embodiments taken in conjunction with the drawings.

DESCRIPTION OF THE PREFERRED EMBODIMENTS

Figure 2:
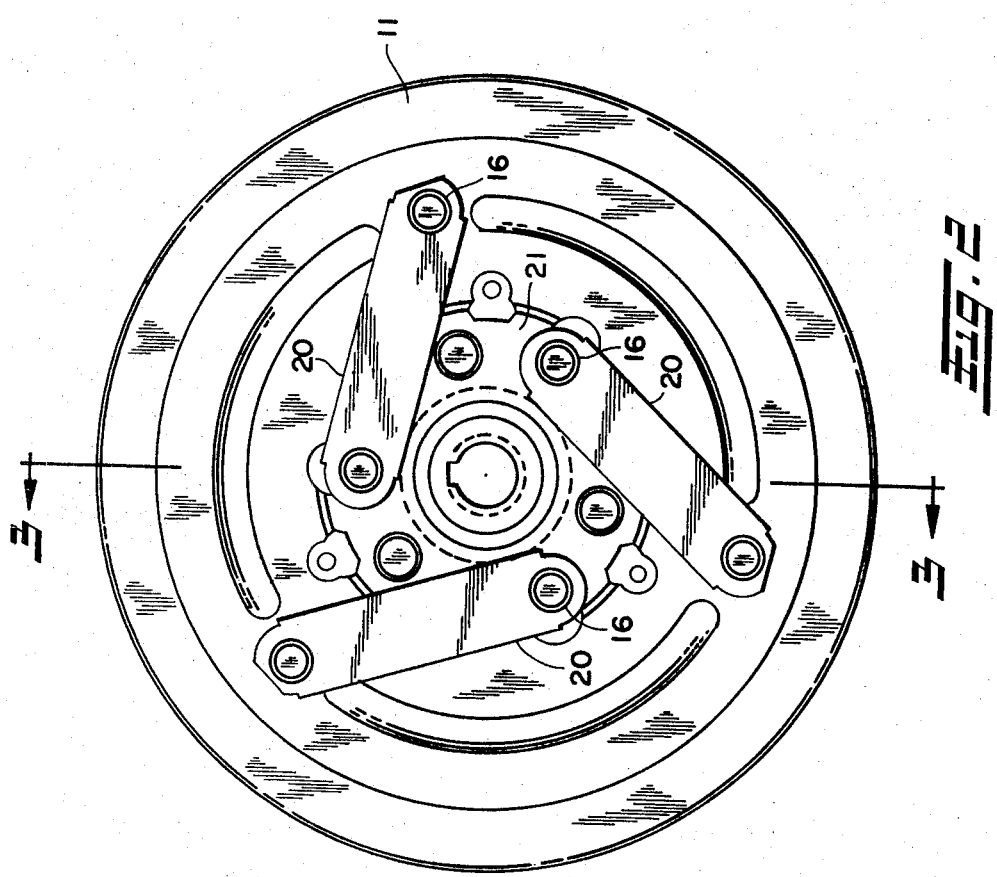
FIG. 2 is an axial view of the clutch of FIG. 1 taken along the line 2—2 thereof.
Figure 1:
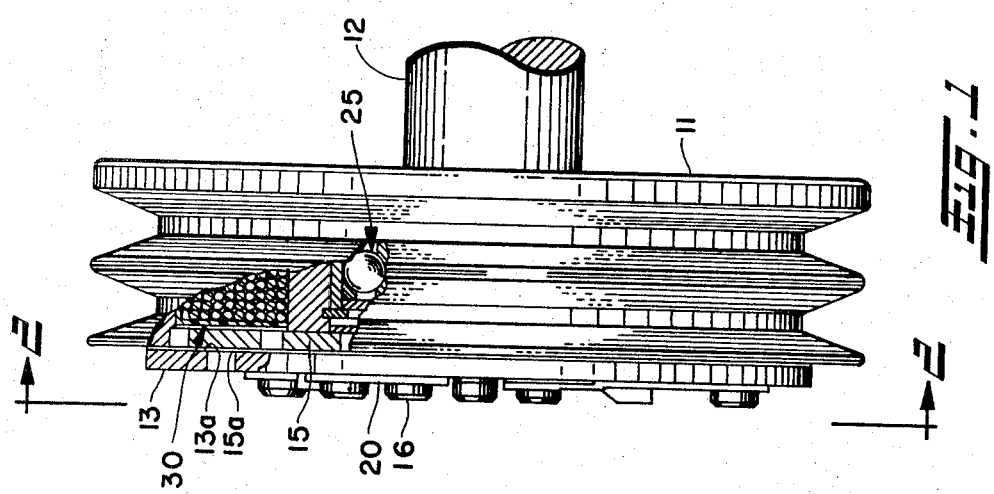
FIG. 1 is an elevational view of one embodiment of the electromagnetic coupling of the present invention.

Referring now to FIGS. 1 and 2, one embodiment of an electromagnetic clutch 10 is shown to include a driving member 11, in the form of a pulley, and a driven member 12, in the form of a shaft. Torque is transmitted from the driving member 11 to the driven member 12 through a clutch mechanism which includes a torque-transmitting armature member 13 which is drivingly connected to the driven member or shaft 12. Upon energization of the electromagnetic clutch 10, the armature 13 is electromagnetically coupled to the rotating pulley driving member, thus causing rotation of the driven member or shaft 12. This coupling results in torque being transmitted from the driving member or pulley 11 to the armature 13 by virtue of a frictional engagement of a surface 13a on the armature 13 with a surface 15a of a cover member 15. The cover member 15 is suitably secured to the pulley driving member 11 by fastening means known to those skilled in the art as, for example, rivets or screws.

The armature 13, as shown in FIG. 1, has a free-running position in which frictional engagement of a surface 15a on the cover member 15 with the surface 13a is prevented, and consequently torque is not transmitted between the pulley 11 and the shaft 12. This free-running position is effected by biasing the armature 13 axially to the free-running or nontorque transmitting position by means of a plurality of spring members 20 which are connected to a hub portion 21 of shaft 12 by rivets 16. The spring members 20 bias the armature 13 away from engagement with the cover member 15. When the armature 13 is in the free-running position with respect to the cover 15, the pulley 11 rotates freely with respect to shaft 12. The pulley 11 is supported by a bearing assembly, generally designated by the numeral 25, which allows rotation of the pulley 11 relative to the shaft 12. The driving connection between the hub portion 21 and the shaft 12 may take any convenient form known to those skilled in the art, and will not be described in detail herein.

The armature 13 is axially movable from the position shown in FIG. 1 into a torque transmitting or driving relationship with the cover 15 upon the energization of an electrical coil 30 in a manner well known to those skilled in the art. The energization of the electrical coil 30 thus selectively controls the transmission of torque from the pulley 11 to the shaft 12.

Figure 3:
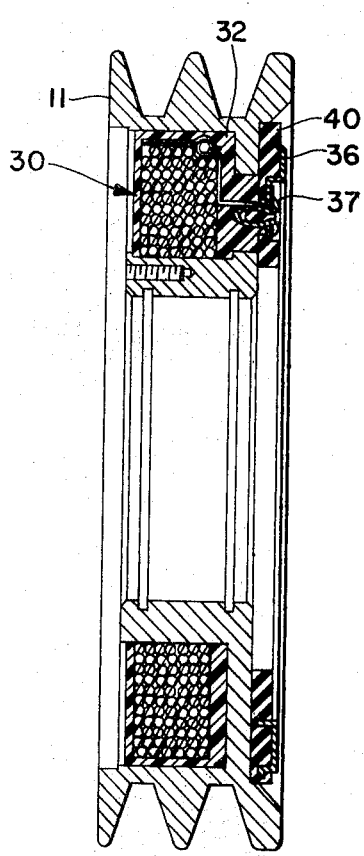
FIG. 3 is a cross-sectional view of a part of the clutch of FIG. 1 taken along lines 3—3 of FIG. 2.
Figure 4:
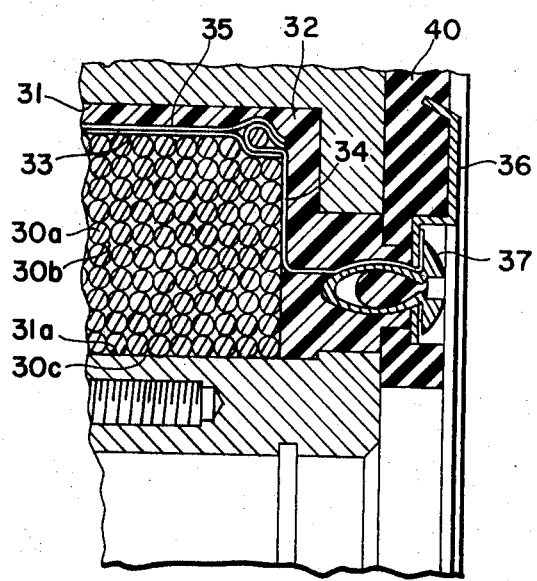
FIG. 4 is a fragmentary sectional view on an enlarged portion of FIG. 3.

As may be best seen with reference to FIGS. 3 and 4, the electrical coil 30 has an annular configuration which encircles the common axis of rotation of the pulley member 11 and the shaft 12. An annular recess 31 is formed in the face of the pulley member 11 within which the coil member 30 is located. In this particular embodiment of the invention, the coil 30 is encapsulated by a synthetic resinous substance, preferably an epoxy compound 32 which electrically insulates substantially the entire coil 30 from the body of the pulley 11. The coil 30 is assembled from a continuous conductor 30a, preferably in wire form, wound into a plurality of layers of windings to have an annular configuration overall. The windings of the electrical conductor 30a are insulated from each other by a coating of insulating material 30b provided continuously over the conductor 30a in a manner known in the art of electrical coil manufacturing. Electrical lead means is provided for connecting the coil to a power source (not shown). The lead means includes a power lead 34 which connects the outer windings of the coil 30 to a slip ring 36. This connection is accomplished by securing the slip ring 36 and one end of the lead 34 to the pulley 11 by a suitable fastener 37 such as a rivet. The other end of the lead 34 is wrapped around one of the outer windings of coil 30 from which end the insulation in the region which is to contact the end of the power lead 34 is removed during ultrasonic welding of the lead 34 to the outer winding of the coil 30. In order to prevent shorting of the end of the power lead 34 to adjacent coil windings or to the pulley 11, a layer of insulating material 33 as, for example, electrically insulating tape is placed over the outer periphery of the annular coil windings and under the region of the one or the outer windings contacting the power lead 34. The end of the power lead 34 is secured to the outer coil winding by wrapping one end of the power lead 34 around the outer winding and ultrasonically welding the power lead 34 onto the outer coil winding.

Figures 6, 6A:
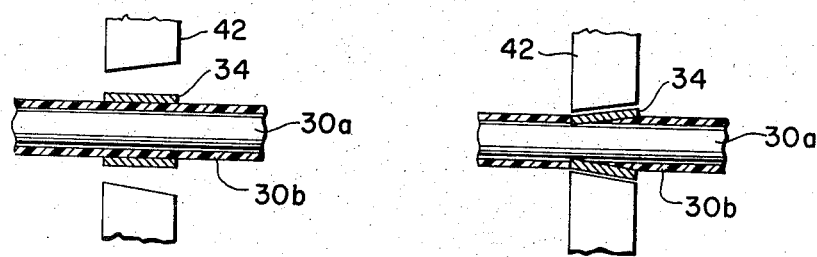
FIGS. 6 and 6a are a schematic of a method of ultrasonically welding a lead wire to a coil of the coupling.

As is best seen with reference to FIG. 6, the power lead 34 is pressed to the outer winding of the coil 30 and ultrasonically welded thereto by an angled ultrasonic horn 42. The angular pressing of the power lead 34 onto the outer winding of the coil 30 allows the insulation 30 on the outer winding to be easily penetrated by the power lead 34. The angled portion of the power lead 34 faces the end of the outer winding of the coil 30. This angled connection of the power lead 34 to the outer winding also provides a natural path for any ultrasonically melted insulation 30b to flow away from the area electrically joining the power lead 34 to the electrical conductor 30a. As shown in FIG. 4, a second layer of insulating material 35, similar to layer 33, is placed over the connection of the power lead 34 to the outer coil winding to prevent shorting of the power lead 34 to the pulley 11.

In the preferred practice of the invention, the electrical power lead 34 comprises a flat strip of electrically conductive material and preferably has a width of one-eighth inch and a thickness of one-sixty-fourth inch. As shown in FIG. 3, the power lead 34 is also embedded in the epoxy material 32 upon assembly of the coil to the pulley 11.

The coil is assembled to the pulley as follows. An insulating ring 40 is first attached to the face of the pulley 11 opposite the cover member 15. The insulating ring 40 insulates the slip ring 36 from the body of the pulley 11. The electrical coil 30 is then grounded directly to the body of the pulley member 11. The grounding of the coil 30 is accomplished, as will hereinafter be described in detail, by a relatively simple procedure using a coil construction which is reliable in operation and easy to manufacture. The pulley 11 is made to have an axially extending radial inner surface 31a in the recess 31. The radially inner periphery 30c of the coil 30 is no larger than the radial inner surface 31a of the recess 31 and is press-fitted directly onto the annular surface 31a of the recess 31 in the pulley member. The coil 30 is grounded to the inner periphery 30c due to the interference fit existing between the radially inner portion of the insulation 30b on the innermost windings of the coil 30 and the axially extending inner periphery 31a of the recess 31.

The grounding of the coil 30 and how it is effected will become clearer upon a review of details involved in the coil 30 construction. Each coil 30 is manufactured from a continuous conductor 30a having a coating of insulation 30b. In the manufacture of the coil 30, the conductor 30a has the insulating material 30b formed from an uncured synthetic resinous material. The conductor 30a with uncured synthetic 30b is wound over a suitable removable winding form (not shown) having a predetermined diameter to form the annular coil 30. The wound coil 30 is then heated sufficiently to cure the resinous insulation material and bond the windings integrally to form the coil 30. The heating is preferably performed by passing electrical current through the coil windings, of a magnitude such that the resistance of the conductor 30a causes the coil 30 to be heated and the insulation 30b on adjacent windings to be bonded together and cured. The winding form is then removed from the cured and completed coil 30. The coil 30 is then interference pressed over the slightly larger diameter axially extending surface 31a of the recess 31 in a manner that removes a portion of the insulation from the inner periphery of the innermost windings of the conductor 30a forming the radially inner periphery of the coil 30. This inner portion of the coil 30 is thus electrically grounded to the axially extending inner periphery 31a of the recess 31. Clearly, a portion of the insulation could be removed from the innermost windings of the conductor 30a prior to the interference pressing of the coil 30 over the surface 31a. The coil is retained within the recess 31 by the tension in the inner windings of the coil, which are in a slightly stretched condition as a result of the interference fit. The dimensional stability of the inner periphery of the wound coil will be dependent upon the tension maintained in the conductor 30a during the winding of the coil 30. If sufficient tension is held in the conductor 30a during winding, upon removal of the winding form from the cured coil 30, the inner periphery of the coil 30 may shrink from the residual tension in the coil 30 conductor windings. Where it is desirable to wind the coil 30 with sufficient tension to cause substantial shrinkage, the inner diameter of the completed and cured coil 30 may be sized to a suitable dimension such that the coil 30 may be readily pressfitted over the inner periphery 31a of the pulley recess 31. This sizing may involve the removal of a portion of the insulation 30b from the inner periphery of the coil 30.

Once the coil 30 is grounded, the end of the electrical power lead 34 is secured, in an electrically conducting manner, to the slip ring 36 by the fastener 37. The fastener 37 compresses the power lead 34 between the head of the fastener 37 and a surface of the slip ring 36.

Subsequent to the assembly of the coil 30 onto the pulley 11 in the foregoing manner, epoxy filler material 32 is cast into the space existing between the inner radially extending axial face of the coil 30 and the pulley recess 31. The epoxy is cured to thereby permanently pot the coil onto the pulley 11.

The above described embodiment thus provides a unique, yet simple, construction for an electromagnetic coupling, or clutch of the type used for automotive air conditioning compressors, wherein the coil 30 is rotatably mounted within the pulley 11 and grounded thereto by interference pressing the coil 30 directly onto the inner periphery 31a of a recess 31 in the face of the pulley 11.

Figure 5:
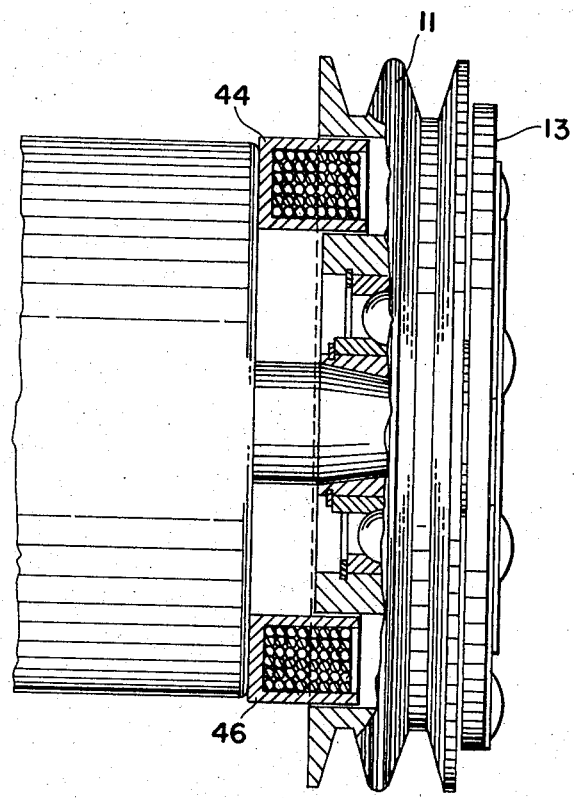
FIG. 5 is a cross-sectional view of another embodiment of the present invention.

In another embodiment of the present invention, the coil 30 is stationarily mounted within an electromagnetic coupling, as may be seen in FIG. 5. The coil 30 is mounted within a mounting member 46 which is directly mounted to a wall 44 of the air conditioning compressor. The stationary mounting member 46 containing the grounded coil 30 is located proximate to the pulley 11 and is partially shrouded by the pulley 11. The coil 30 is energized from a power source (not shown) through the power lead wire 34 which is ultrasonically welded to the coil 30 in the manner described previously. Grounding of the coil 30 is effected by interference pressing the coil 30 into the mounting member 46 also in the manner described previously. The electromagnetic coupling operates to couple the driven member 13 to the driving pulley 11. Upon energization of the coil 30, the driven member 13 is electromagnetically coupled to the driving member 15 and remains so until the coil 30 is deenergized.

It will be thus appreciated that the unique electromagnetic coupling construction and coil 30 mounting described herein is equally applicable to electromagnetic couplings using stationary coil mountings as well as rotatable coil mountings. The grounding of the coil 30 in both embodiments is accomplished by interference pressing the coil 30 into a coil mounting means whether it is stationary, as in the mounting member 46, or it is rotatable, as in the pulley 11. Clearly the ultrasonic welding of the power lead 34 to the coil 30 and the other aspects of coil construction are also equally applicable to stationary and rotatable coil 30 mountings.

Other modifications and variations of the present invention will become apparent to those skilled in the art upon reading the disclosure. Such modifications and variations have been omitted herein for the sake of conciseness and clarity but the invention is limited only by the following claims.

What is claimed is:

1. An electromagnetic coupling assembly for transmitting torque between a driving member and a driven member in response to the energization state of the coupling comprising:

energizing means operative to selectively couple the driving and driven member;

mounting means having an annular recess with an inner annular surface for mounting said energizing means;

said energizing means including an annular electric coil mounted in the recess of said mounting means to have portions of an inner annular surface of said coil in electrical contact with the inner annular surface of the recess of said mounting means;

means for connecting one end of said coil to a source of electrical energy to provide energization of said coil by the conduction of current between the one end of said coil and the inner annular surface of said coil in electrical contact with said mounting means; and means for electrically insulating said electric coil from said mounting member in all but portions of the inner annular surface of said coil in electrical contact with said mounting member.

2. An electromagnetic coupling as set forth in claim 1, wherein said mounting means includes a rotatable driving pulley having an annular recess for mounting said electric coil to rotate with said pulley, said pulley further having engaging means for selectively engaging the driven member in response to an energization state of said electric coil.

3. An electromagnetic coupling as set forth in claim 1 wherein said mounting means includes a stationary mounting member having an annular recess for mounting said electric coil proximately to the driving member and the driven member to effect the coupling of the driven member to the driving member in response to an energization state of said electric coil.

4. An electromagnetic coupling as set forth in claim 1 wherein said electric coil includes a continuous annular winding of a conductive material and wherein said connecting means includes a power lead connectable to a power source at one end with the other end welded around the periphery of one end of said conductive material of said electric coil.

5. An electromagnetic coupling as set forth in claim 4 wherein said electrical insulating means includes an insulating coating encasing said conductive material and wherein said power lead is ultrasonically welded to said insulated conductive material and said insulation is removed from said conductive material in the area of said power lead to provide electrical contact between said power lead and said conductive material.

6. An electromagnetic coupling as set forth in claim 5 wherein said power lead is in angular contact with said conductive material along the periphery of a cross-section of said conductive material.

* * * * *